United States Patent
Chen et al.

(10) Patent No.: US 9,229,537 B2
(45) Date of Patent: Jan. 5, 2016

(54) COVERING STRUCTURE, INPUT DEVICE, AND MANUFACTURING METHOD OF COVERING STRUCTURE

(71) Applicant: CHICONY ELECTRONICS CO., LTD., New Taipei (TW)

(72) Inventors: I-Heng Chen, Taipei Hsien (TW); Chung-Yao Lin, Taipei Hsien (TW); Yu-Hsiu Lin, Taipei Hsien (TW)

(73) Assignee: Chicony Electronics Co., Ltd., New Taipei (TW)

( * ) Notice: Subject to any disclaimer, the term of this patent is extended or adjusted under 35 U.S.C. 154(b) by 105 days.

(21) Appl. No.: 14/255,887

(22) Filed: Apr. 17, 2014

(65) Prior Publication Data
US 2015/0185862 A1 Jul. 2, 2015

(30) Foreign Application Priority Data
Dec. 31, 2013 (TW) .............................. 102149333 A

(51) Int. Cl.
| G06F 1/16 | (2006.01) |
| G06F 3/02 | (2006.01) |
| B32B 5/24 | (2006.01) |
| B32B 9/02 | (2006.01) |
| B32B 9/04 | (2006.01) |
| B32B 7/12 | (2006.01) |

(52) U.S. Cl.
CPC .............. *G06F 3/0202* (2013.01); *B32B 5/245* (2013.01); *B32B 7/12* (2013.01); *B32B 9/025* (2013.01); *B32B 9/046* (2013.01); *B32B 2262/0261* (2013.01); *B32B 2266/0278* (2013.01); *B32B 2457/00* (2013.01)

(58) Field of Classification Search
USPC ............ 428/40.2, 328, 336, 349, 319.1, 35.7; 359/359; 206/525, 480, 138, 528, 376, 206/484; 345/80, 173, 418, 419, 3.1, 501, 345/174, 619, 473, 161, 427; 361/679.01, 361/679.09, 679.4, 679.31, 679.02, 679.21, 361/679.26, 679.27, 679.39, 679.33, 361/679.48, 679.46, 679.59, 679.58, 361/679.49; 455/457, 255, 424
See application file for complete search history.

(56) References Cited

U.S. PATENT DOCUMENTS

| 5,386,219 A * | 1/1995 | Greanias et al. ............... 345/174 |
| 2013/0065471 A1* | 3/2013 | Mortimer ...................... 442/394 |
| 2014/0057064 A1* | 2/2014 | Sasaki et al. ................. 428/40.2 |

* cited by examiner

*Primary Examiner* — Hung Duong
(74) *Attorney, Agent, or Firm* — Blakely, Sokoloff, Taylor & Zafman LLP

(57) ABSTRACT

A covering structure including a bottom covering layer, a top covering layer, and a thermoplastic material layer is disclosed. The thermoplastic material layer is laminated between the bottom covering layer and the top covering layer. The thermoplastic material layer includes a first thermoplastic material layer part and a second thermoplastic material layer part that are connected to each other. The first thermoplastic material layer part has a first thickness. The second thermoplastic material layer part has a second thickness. The first thickness is larger than the thickness of the top covering layer. The first thickness is 4~7 times of the second thickness. The disclosure further discloses an input device using the covering structure and a manufacturing method of the covering structure.

24 Claims, 8 Drawing Sheets

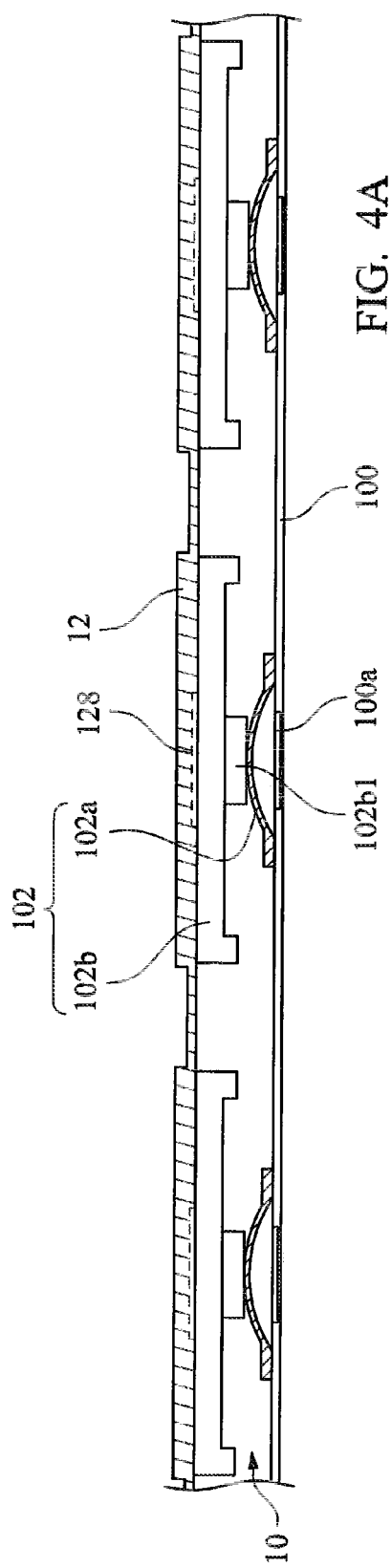
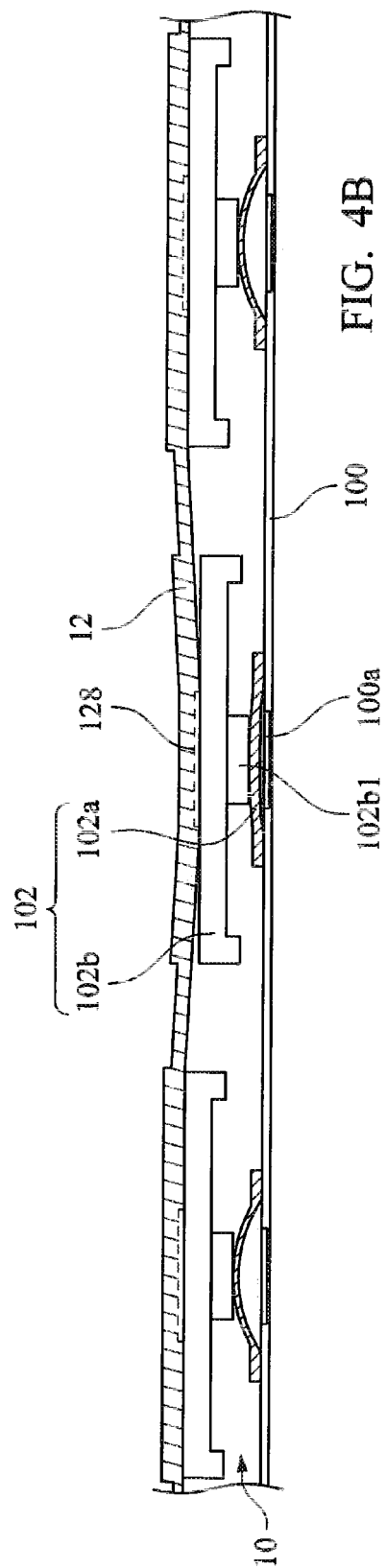

COVERING STRUCTURE, INPUT DEVICE, AND MANUFACTURING METHOD OF COVERING STRUCTURE

RELATED APPLICATIONS

This application claims priority to Taiwanese Application Serial Number 102149333, filed Dec. 31, 2013, which is herein incorporated by reference.

BACKGROUND

1. Technical Field

The present disclosure relates to a covering structure, an input device, and a manufacturing method of covering structure.

2. Description of Related Art

In recent years, although tablet computers gradually become popular, keyboards (or mice) remain important input devices to input text, symbols or numbers owing to the habits of using personal computers. Hence, a thin touch keyboard designed for tablet computers has been provided. The thin touch keyboard can be used as a protective cover of the tablet computers. In order to achieve the thin appearance, the touch keyboard uses a FSR (Force Sensitive Resistor) as the component for sensing input signals, and a covering layer is covered on the FSR for touched by users.

However, the touch keyboard cannot provide the users a pressing feeling similar to that a conventional keyboard can provide, so the users cannot realize whether keyswitches have been successfully triggered. Furthermore, the covering layer of the touch keyboard is too flat, so the users cannot obviously feel whether the fingers are placed on the keyswitches. In order to solve the problem, an approach of disposing pressing pads on the covering layer of the touch keyboard to respectively correspond to the keyswitches is developed, which looks forward to simulate the pressing feeling that the conventional keyboard can provide. Nevertheless, the pressing feeling provided by the pressing pad still cannot be compared with that the conventional keyboard can provide, and the process of disposing the pressing pads on the covering layer of the touch keyboard must face the issue of alignment accuracy. As a result, the total manufacturing costs of the touch keyboard will increased due to the additionally disposed pressing pads.

In addition, when manufacturing the pressing pads, glue can be firstly injected in a mold to form several pieces of glue respectively corresponding to the keyswitches. After hardened, the pieces of glue must be attached on a sheet. It can be seen that the manufacturing process are complicated and time-consuming.

Accordingly, how to provide an input device capable of providing a better pressing feeling, in which the covering layer of the input device has low manufacturing costs and rapid manufacturing procedure, becomes an important issue to be solved by those in the industry.

SUMMARY

The disclosure provides a covering structure. The covering structure includes a bottom covering layer, a top covering layer, and a thermoplastic material layer. The thermoplastic material layer is laminated between the bottom covering layer and the top covering layer. The thermoplastic material layer includes a first thermoplastic material layer part and a second thermoplastic material layer part that are connected to each other. The first thermoplastic material layer part has a first thickness. The second thermoplastic material layer part has a second thickness. The first thickness is larger than the thickness of the top covering layer. The first thickness is larger than the second thickness.

In an embodiment of the disclosure, the first thickness is 4~7 times of the second thickness.

In an embodiment of the disclosure, the bottom covering layer includes a first bottom layer part and a second bottom layer part that are connected to each other. The first thermoplastic material layer part is laminated between the first bottom layer part and the top covering layer. The second thermoplastic material layer part is laminated between the second bottom layer part and the top covering layer. The first bottom layer part has a third thickness. The second bottom layer part has a fourth thickness. The third thickness is larger than the fourth thickness.

In an embodiment of the disclosure, the third thickness is 1.2~1.7 times of the fourth thickness.

In an embodiment of the disclosure, the sum of the first thickness, the third thickness, and the thickness of the top covering layer is 1.5~2.3 times the sum of the second thickness, the fourth thickness, and the thickness of the top covering layer.

In an embodiment of the disclosure, the covering structure further includes an adhesive layer. The adhesive layer is adhered between the top covering layer and the thermoplastic material layer.

In an embodiment of the disclosure, the material of the bottom covering layer includes nylon. The material of the thermoplastic material layer includes Polyurethane.

In an embodiment of the disclosure, the bottom covering layer is a knitted fabric layer. The top covering layer is a leather layer. The thermoplastic material layer is a foam layer.

The disclosure further provides an input device. The input device includes a keyboard module and a covering structure. The keyboard module includes a plurality of keyswitch units. The covering structure includes a bottom covering layer, a top covering layer, and a thermoplastic material layer. The bottom covering layer covers and is attached to the keyboard module. The thermoplastic material layer is laminated between the bottom covering layer and the top covering layer. The thermoplastic material layer includes a plurality of first thermoplastic material layer parts and a second thermoplastic material layer part. The second thermoplastic material layer part is connected to the first thermoplastic material layer parts. The first thermoplastic material layer parts respectively correspond to regions of the keyswitch units. The second thermoplastic material layer part corresponds to a region outside the keyswitch units. Each of the first thermoplastic material layer parts has a first thickness. The second thermoplastic material layer part has a second thickness. The first thickness is larger than the thickness of the top covering layer. The first thickness is larger than the second thickness.

In an embodiment of the disclosure, the bottom covering layer includes a plurality of first bottom layer parts and a second bottom layer part. The second bottom layer part is connected to the first bottom layer parts. Each of the first thermoplastic material layer parts is laminated between the corresponding first bottom layer part and the top covering layer. The second thermoplastic material layer part is laminated between the second bottom layer part and the top covering layer. Each of the first bottom layer parts has a third thickness. The second bottom layer part has a fourth thickness. The third thickness is larger than the fourth thickness.

In an embodiment of the disclosure, each of the keyswitch units is a dome supporting type keyswitch.

In an embodiment of the disclosure, each of the keyswitch units is a scissors-like supporting type keyswitch.

In an embodiment of the disclosure, the keyboard module is a force-sensing resistor keyboard.

The disclosure further provides a manufacturing method of covering structure. The manufacturing method includes: providing a bottom covering layer; laminating a thermoplastic material layer to the bottom covering layer; hot-pressing the thermoplastic material layer to form a first thermoplastic material layer part that is not hot-pressed and a second thermoplastic material layer part that is hot-pressed, in which the first thermoplastic material layer part has a first thickness, the second thermoplastic material layer part has a second thickness, and first thickness is 4~7 times of the second thickness; and laminating a top covering layer to the thermoplastic material layer, in which the first thickness is larger than the thickness of the top covering layer.

In an embodiment of the disclosure, the step of providing the bottom covering layer includes: hot-pressing the bottom covering layer to form a first bottom layer part that is not hot-pressed and a second bottom layer part that is hot-pressed, in which the first thermoplastic material layer part is laminated between the first bottom layer part and the top covering layer, the second thermoplastic material layer part is laminated between the second bottom layer part and the top covering layer, the first bottom layer part has a third thickness, the second bottom layer part has a fourth thickness, and the third thickness is 1.2~1.7 times of the fourth thickness.

In an embodiment of the disclosure, the step of laminating the top covering layer to the thermoplastic material layer includes: applying an adhesive layer to the thermoplastic material layer, so as to make the top covering layer and the thermoplastic material layer that are laminated be adhered to each other.

Accordingly, the covering structure of the present disclosure is formed by laminating the bottom covering layer, the top covering layer, and the thermoplastic material layer, and both of the bottom covering layer and the thermoplastic material layer are hot-pressed to form different regions having different thicknesses. The regions of the bottom covering layer and the thermoplastic material layer that are not hot-pressed (or are hot-pressed with a smaller magnitude) correspond to the regions of the keyswitch units of the input device, and the covering structure is thicker at the regions of the bottom covering layer and the thermoplastic material layer. The other regions of the bottom covering layer and the thermoplastic material layer that are hot-pressed correspond to the regions outside the keyswitch units, and the covering structure is thinner at the regions of the bottom covering layer and the thermoplastic material layer. In other words, by performing the simple hot-pressing processes, the covering structure of the disclosure can form pressing portions having definite structures at the regions corresponding to the regions of the keyswitch units, so the problem of alignment accuracy of the conventional pressing pads can be solved. In addition, the keyswitch units of the input device of the disclosure can be dome supporting type keyswitches or scissors-like supporting type keyswitches, so the users can obtain better pressing feelings while pressing the keyswitch units through the covering structure, and can definitely realize whether the keyswitch units have been successfully triggered according to the pressing feelings.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 4A a partial cross-sectional view of the input device in FIG. 1A, in which keyswitch units are not pressed;

FIG. 4B another partial cross-sectional view of FIG. 4A, in which the keyswitch units are pressed;

DETAILED DESCRIPTION

Figure 1A:
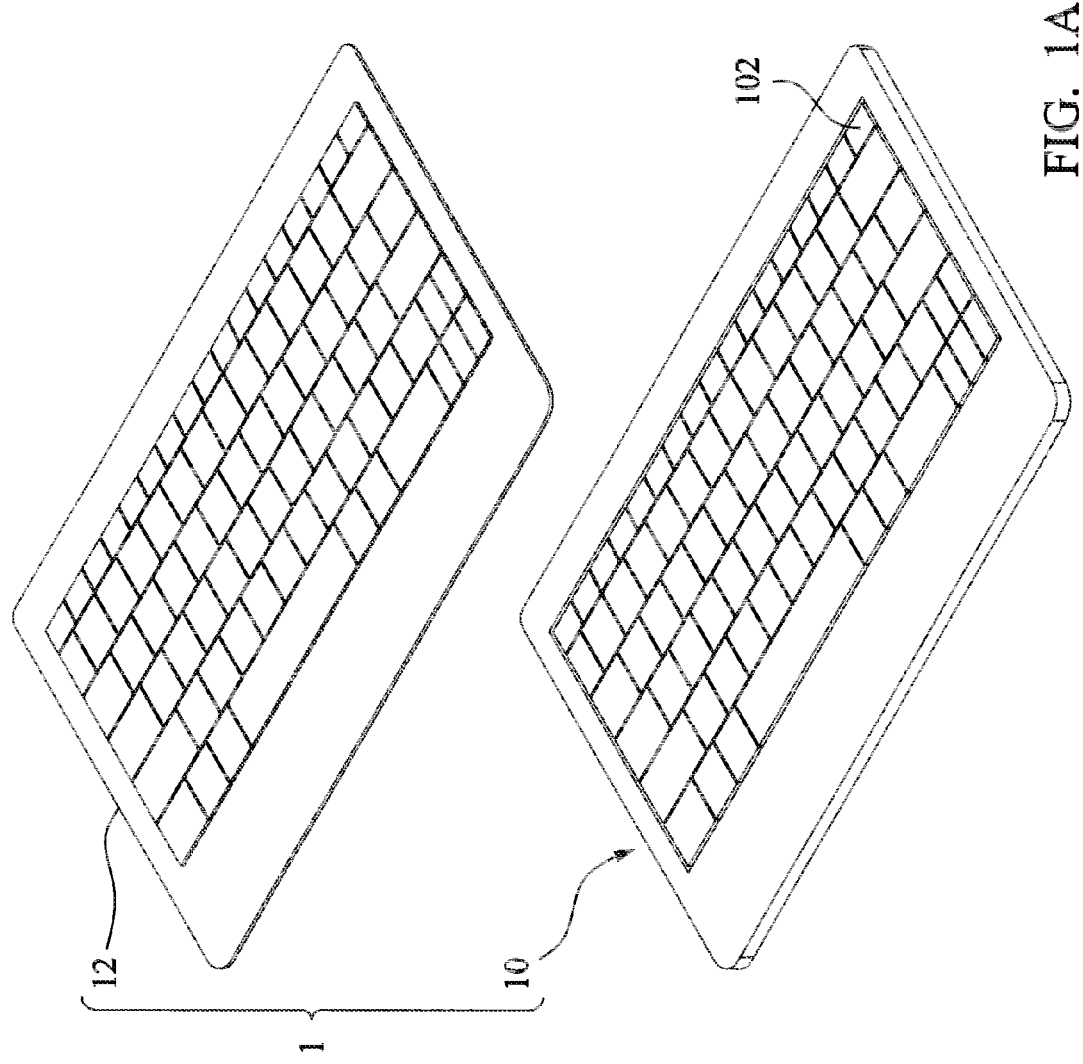
FIG. 1A is an exploded view of an input device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
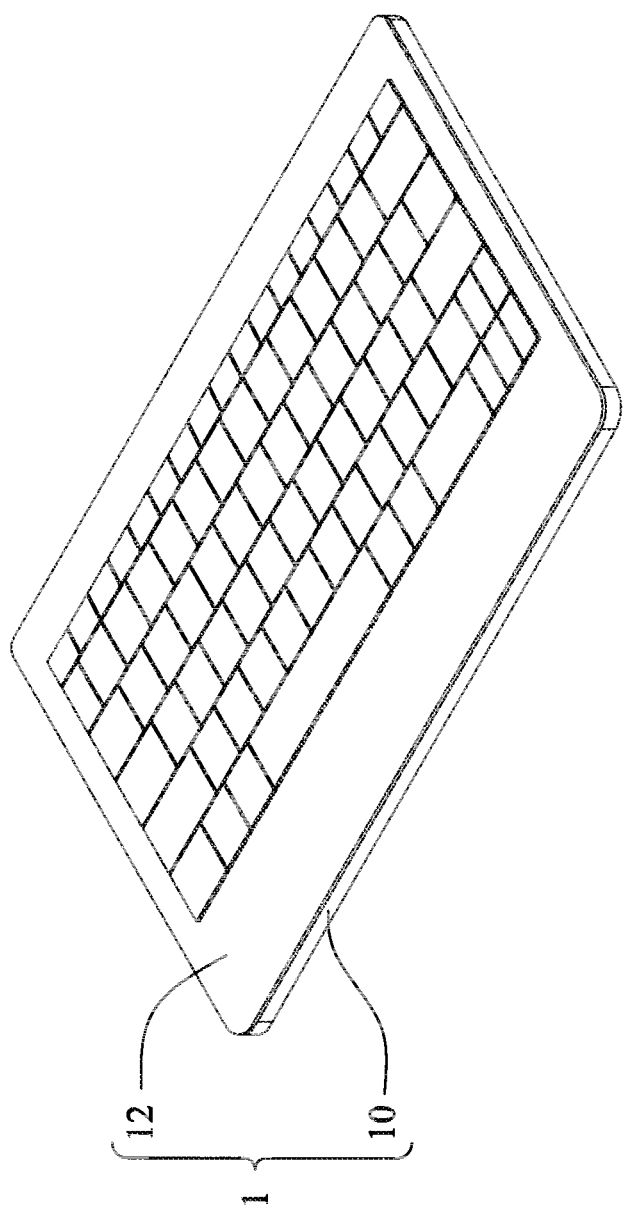
FIG. 1B is a perspective view of the input device in FIG. 1A.
Figure 2:
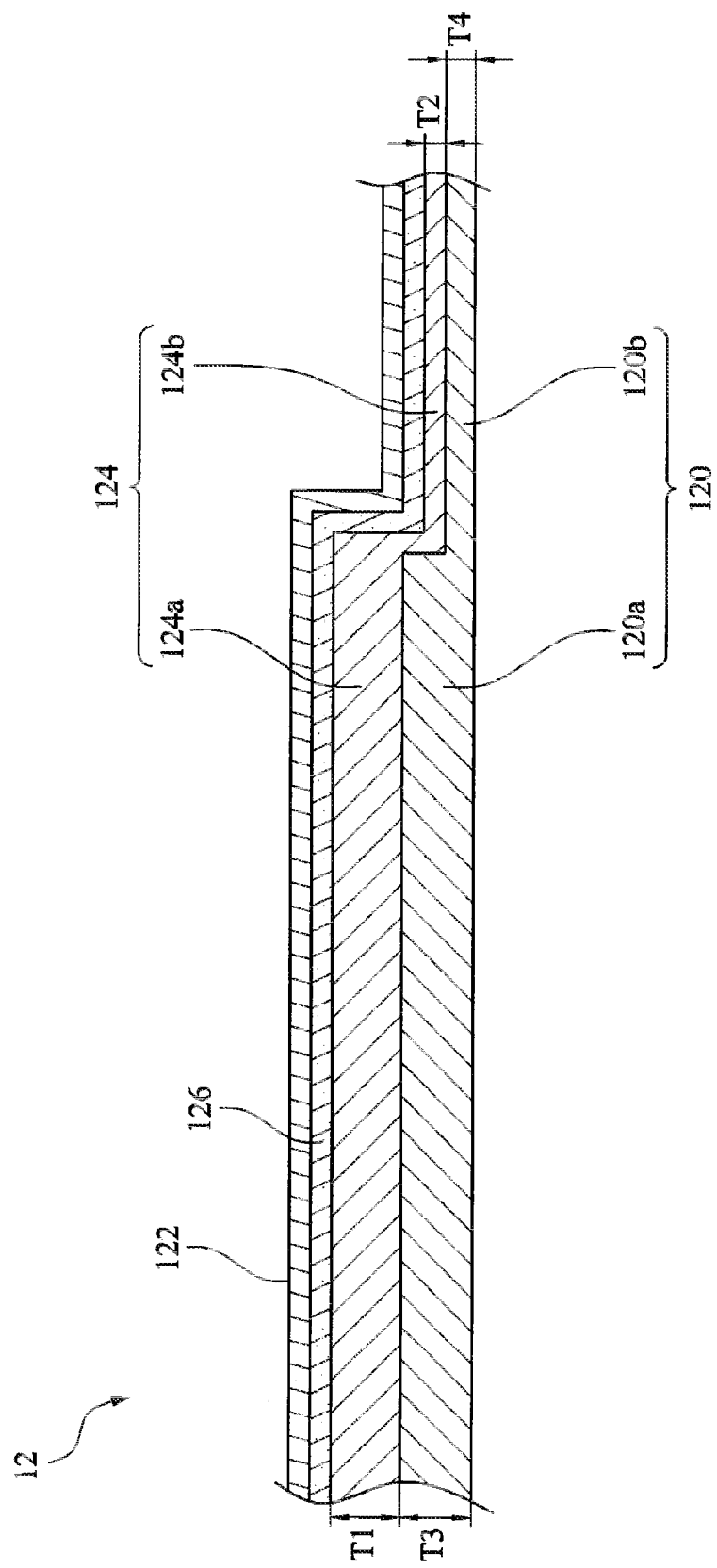
FIG. 2 is a cross-sectional view of the covering structure in FIG. 1A.

FIG. 1A is an exploded view of an input device 1 according to an embodiment of the disclosure. FIG. 1B is a perspective view of the input device 1 in FIG. 1A. FIG. 2 is a cross-sectional view of a covering structure 12 in FIG. 1A.

As shown in FIG. 1A to FIG. 2, the input device 1 includes a keyboard module 10 and the covering structure 12. The keyboard module 10 of the input device 1 includes a plurality of keyswitch units 102. The covering structure 12 of the input device 1 includes a bottom covering layer 120, a top covering layer 122, and a thermoplastic material layer 124. In the embodiment of the disclosure, the bottom covering layer 120 can be a knitted fabric layer, the top covering layer 122 can be a leather layer, and the thermoplastic material layer 124 is a foam layer. The bottom covering layer 120 of the covering structure 12 covers and is attached to the keyboard module 10. The thermoplastic material layer 124 of the covering structure 12 is laminated between the bottom covering layer 120 and the top covering layer 122. The thermoplastic material layer 124 of the covering structure 12 includes a plurality of first thermoplastic material layer parts 124a (FIG. 2 only shows one of the first thermoplastic material layer parts 124a) and a second thermoplastic material layer part 124b. The second thermoplastic material layer part 124b of the thermoplastic material layer 124 is connected to the first thermoplastic material layer parts 124a. The first thermoplastic material layer parts 124a of the thermoplastic material layer 124 respectively correspond to regions of the keyswitch units 102. The second thermoplastic material layer part 124b of the thermoplastic material layer 124 corresponds to a region outside the keyswitch units 102. Each of the first thermoplastic material layer parts 124a of the thermoplastic material layer 124 has a first thickness T1. The second thermoplastic material layer part 124b of the thermoplastic material layer 124 has a second thickness T2. The first thickness T1 is larger than the thickness of the top covering layer 122. The first thickness T1 is 4~7 times of the second thickness T2.

In the embodiment of the disclosure, the thermoplastic material layer 124 of the covering structure 12 can be hot-pressed to form the first thermoplastic material layer parts 124a having the first thickness T1 and the second thermoplastic material layer part 124b having the second thickness T2. The first thermoplastic material layer parts 124a are not hot-pressed (or are hot-pressed with a smaller magnitude), and the second thermoplastic material layer part 124b is hot-pressed. Therefore, the first thermoplastic material layer parts 124a can be corresponded to the regions of the keyswitch units 102 (i.e., the regions just above the keyswitch units 102) to be portions for a user to press, and the second thermoplastic material layer part 124b can be corresponded to the regions outside the keyswitch units 102 to be a portion for preventing dirt from falling into gaps among the keyswitch units 102. It can be deemed that the magnitude with which the second thermoplastic material layer part 124b is hot-pressed is larger than the magnitude with which the first thermoplastic material layer parts 124a are hot-pressed.

As shown in FIG. 2, the bottom covering layer 120 of the covering structure 12 includes a plurality of first bottom layer parts 120a and a second bottom layer part 120b. The second bottom layer part 120b of the bottom covering layer 120 is connected to the first bottom layer parts 120a. Each of the first thermoplastic material layer parts 124a of the thermoplastic material layer 124 is laminated between the corresponding first bottom layer part 120a and the top covering layer 122. The second thermoplastic material layer part 124b of the thermoplastic material layer 124 is laminated between the second bottom layer part 120b of the bottom covering layer 120 and the top covering layer 122. That is, the first bottom layer parts 120a of the bottom covering layer 120 respectively correspond to the regions of the keyswitch units 102, and the second bottom layer part 120b of the bottom covering layer 120 corresponds to the region outside the keyswitch units 102. Each of the first bottom layer parts 120a of the bottom covering layer 120 has a third thickness T3. The second bottom layer part 120b of the bottom covering layer 120 has a fourth thickness T4. The third thickness T3 is 1.2~1.7 times of the fourth thickness T4.

In the embodiment of the disclosure, the bottom covering layer 120 of the covering structure 12 can be hot-pressed to form the first bottom layer parts 120a having the thickness T3 and the second bottom layer part 120b having the fourth thickness T4. The first bottom layer parts 120a are not hot-pressed (or are hot-pressed with a smaller magnitude), and the second bottom layer part 120b is hot-pressed. Therefore, the first bottom layer parts 120a can be corresponded to the regions of the keyswitch units 102 (i.e., the regions just above the keyswitch units 102) to be portions for a user to press, and the second bottom layer part 120b can be corresponded to the regions outside the keyswitch units 102 to be a portion for preventing dirt from falling into gaps among the keyswitch units 102. It can be deemed that the magnitude with which the second bottom layer part 120b is hot-pressed is larger than the magnitude with which the first bottom layer parts 120a are hot-pressed.

In the embodiment of the disclosure, the sum of the first thickness T1 of the first thermoplastic material layer parts 124a, the third thickness T3 of the first bottom layer parts 120a, and the thickness of the top covering layer 122 is 1.5~2.3 times the sum of the second thickness T2 of the second thermoplastic material layer part 124b, the fourth thickness T4 of the second bottom layer part 120b, and the thickness of the top covering layer 122. It can be seen that by performing the simple hot-pressing processes, the covering structure 12 of the disclosure can form pressing portions having definite structures at the regions corresponding to the regions of the keyswitch units 102 (because the pressing portions have larger thickness), so the problem of alignment accuracy of the conventional pressing pads can be solved.

In addition, in order to obtain a better bonding effect between the top covering layer 122 and the thermoplastic material layer 124, the covering structure 12 of the disclosure further includes an adhesive layer 126 (as shown in FIG. 2). The adhesive layer 126 is adhered between the top covering layer 122 and the thermoplastic material layer 124, so that the top covering layer 122 and the thermoplastic material layer 124 can be firmly adhered to each other and are not easy to be separated.

Figure 3:
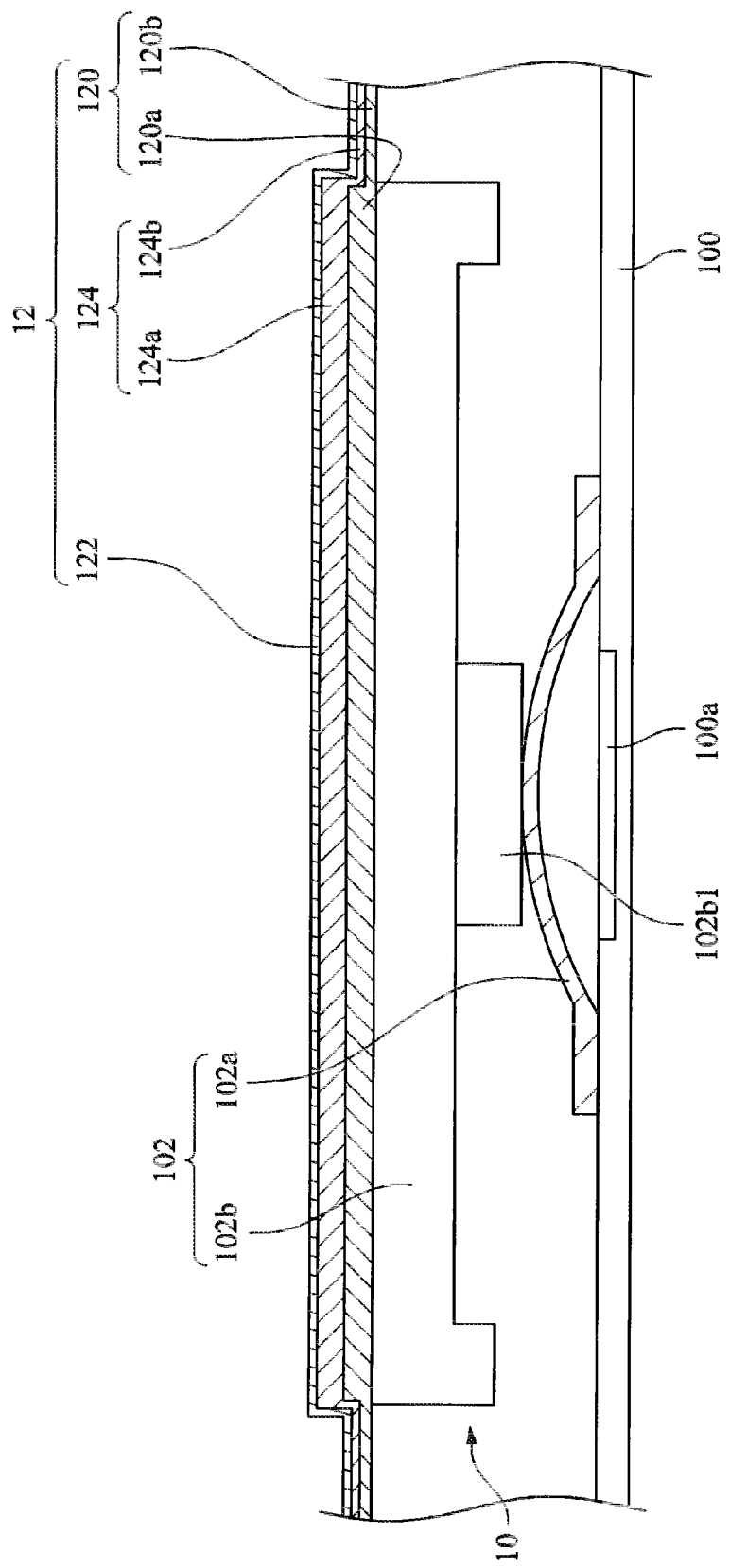
FIG. 3 is a partial cross-sectional view of the input device in FIG. 1B.

FIG. 3 is a partial cross-sectional view of the input device 1 in FIG. 1B. FIG. 4A a partial cross-sectional view of the input device 1 in FIG. 1A, in which the keyswitch units 102 are not pressed. FIG. 4B another partial cross-sectional view of FIG. 4A, in which the keyswitch units 102 are pressed. In order to simplify the figure, the adhesive layer 126 in FIG. 2 is omitted from the covering structure 12 in FIG. 3.

As shown in FIG. 3 to FIG. 4B, the keyboard module 10 of the input device 1 further includes a base 100. A plurality of switches 100a are disposed on the base 100. Each of the switches 100a is disposed under the corresponding keyswitch unit 102. Each of the keyswitch units 102 is a dome supporting type keyswitch and includes a resilient member 102a and a keycap 102b connected to each other. In the embodiment of the disclosure, the resilient member 102a is a metal dome, but the disclosure is not limited in this regard. The resilient member 102a of each of the keyswitch units 102 is disposed on the base 100 and under the corresponding keycap 102b.

With the aforementioned configuration, when the user presses any one of obviously protruding portions on the covering structure 12 (i.e., the portions correspond to the first thermoplastic material layer parts 124a and the first bottom layer parts 120a), the keycap 102b of the corresponding keyswitch unit 102 will be pressed downward, a triggering block at the inner side of the keycap 102b will press and deform the resilient member 102a, and finally the deformed resilient member 102a triggers the corresponding switch 100a to generate a signal corresponding to the pressed keyswitch unit 102. In addition, the bottom of the covering structure 12 has a plurality of adhesive zones 128 (as shown in FIG. 4A and FIG. 4B) respectively correspond to the keycaps 102b of the keyswitch units 102. With reference to FIG. 2, each of the adhesive zones 128 is located between the corresponding first bottom layer part 120a and the corresponding keycap 102b. Hence, the keyswitch units 102 can be firmly mounted to the covering structure 12 without displacing.

It should be pointed out that the bottom covering layer 120, the top covering layer 122, and the thermoplastic material layer 124 of the covering structure 12 are extendable. In order to prevent the problem that a keyswitch unit 102 is Inadvertently triggered by pulled by the covering structure 12 when an adjacent keyswitch unit 102 is pressed, the area of each of the adhesive zones 128 can be smaller than the area of the corresponding first bottom layer part 120a and the area of the corresponding keycap 102b. That is, by decreasing the areas of the adhesive zones 128, the area of the covering structure 12 that is not adhered to the keycaps 102b is increased. Therefore, the portions of the covering structure 12 that can be freely extended are increased, and thus the problem of inadvertently triggering can be prevented because the deformations of the portions of the covering structure 12 are not too large. For example, the area of each of the adhesive zones 128 is ⅛~⅑ times of the area of the corresponding first bottom layer part 120a and ⅛~⅑ times of the area of the corresponding keycap 102b, but the disclosure is not limited in this regard.

In the embodiment of the disclosure, the material of the bottom covering layer 120 includes nylon, and the material of the thermoplastic material layer 124 includes Polyurethane, but the disclosure is not limited in this regard.

Figure 5:
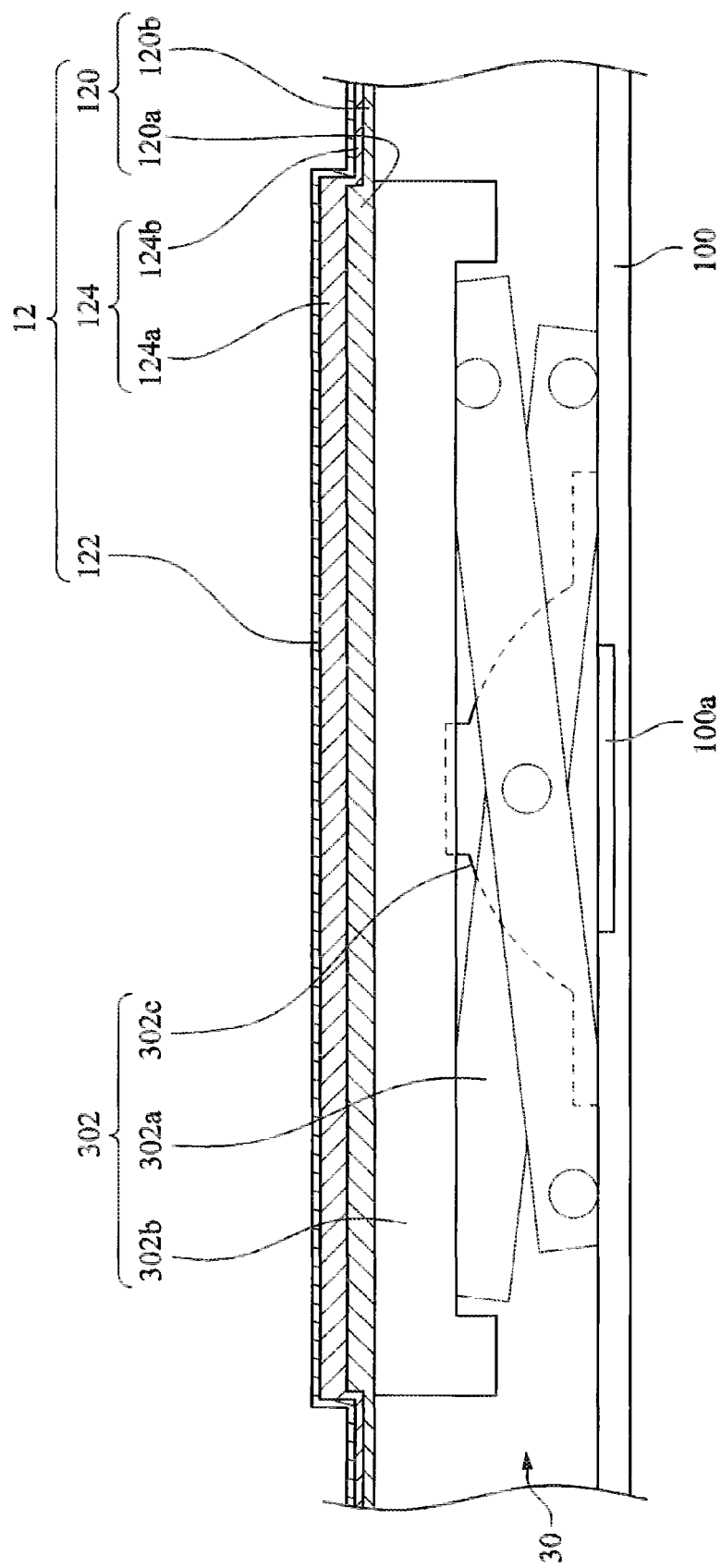
FIG. 5 is a partial cross-sectional view of a keyboard module and a covering structure according to another embodiment of the disclosure.

FIG. 5 is a partial cross-sectional view of a keyboard module 30 and a covering structure 12 according to another embodiment of the disclosure. In order to simplify the figure, the adhesive layer 126 in FIG. 2 is omitted from the covering structure 12 in FIG. 5.

As shown in FIG. 5, the keyboard module 30 of the input device 1 further includes a base 100. A plurality of switches 100a are disposed on the base 100. Each of the switches 100a is disposed under the corresponding keyswitch unit 302. Each of the keyswitch units 302 is a scissors-like supporting type keyswitch and includes a scissors-like supporting structure 302a, a keycap 302b, and a resilient member 302c. The scissors-like supporting structure 302a of each of the keyswitch units 302 is pivotally connected between the base 100 and the corresponding keycap 302b, so as to guide the keycap 302b to move toward or away from the base 100. In the embodiment of the disclosure, the resilient member 302c is a rubber dome, but the disclosure is not limited in this regard. The resilient member 302c of each of the keyswitch units 302 is disposed between the base 100 and the corresponding keycap 302b, so as to make the keycap 302b return to the original position when the keycap 302b is not pressed. The covering structure 12 covers and is attached to the keyboard module 30. The first bottom layer parts 120a of the bottom covering layer 120 and the first thermoplastic material layer parts 124a of the thermoplastic material layer 124 correspond to regions of the keyswitch units 302, and the second bottom layer part 120b of the bottom covering layer 120 and the second thermoplastic material layer part 124b of the thermoplastic material layer 124 correspond to a region outside the keyswitch units 302.

With the aforementioned configuration, when the user presses any one of obviously protruding portions on the covering structure 12 (i.e., the portions correspond to the first thermoplastic material layer parts 124a and the first bottom layer parts 120a), the keycap 302b of the corresponding keyswitch unit 302 will be pressed downward, the keycap 102b will press and deform the resilient member 302c, and finally the deformed resilient member 302c triggers the corresponding switch 100a to generate a signal corresponding to the pressed keyswitch unit 302.

Figure 6:
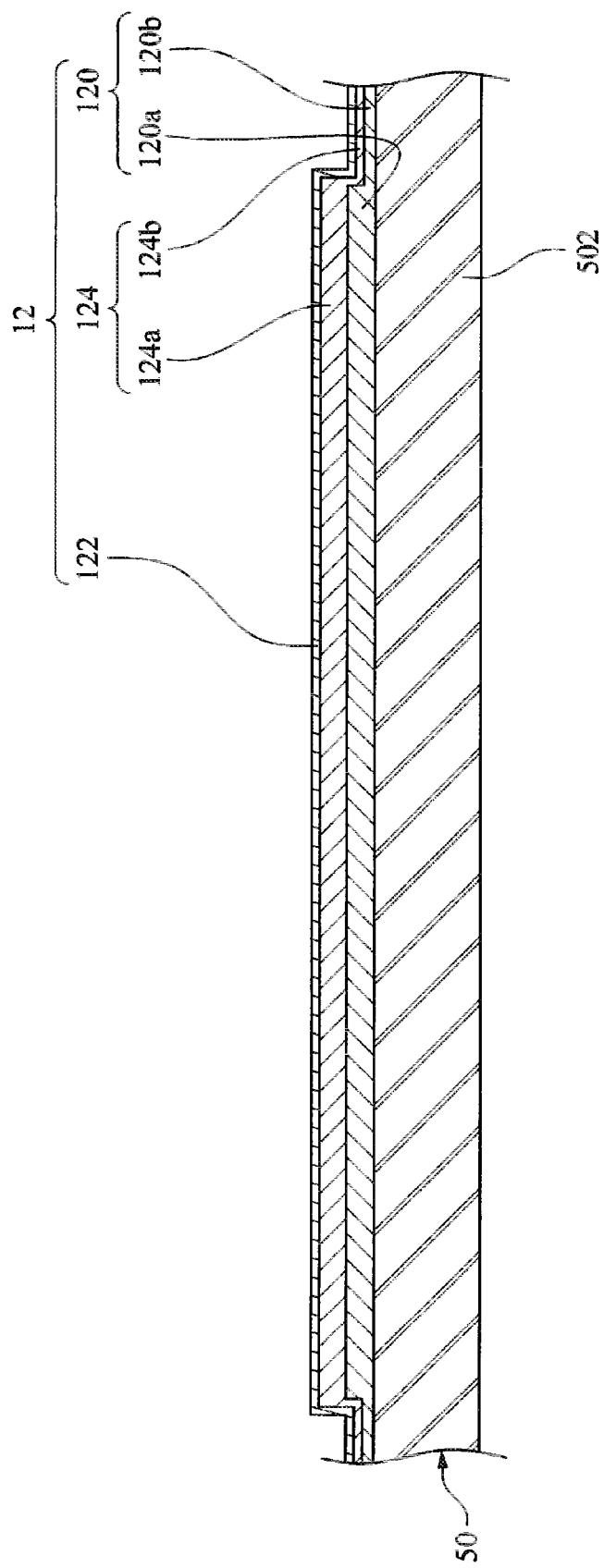
FIG. 6 is a partial cross-sectional view of a keyboard module and a covering structure according to another embodiment of the disclosure.

FIG. 6 is a partial cross-sectional view of a keyboard module 50 and a covering structure 12 according to another embodiment of the disclosure. In order to simplify the figure, the adhesive layer 126 in FIG. 2 is omitted from the covering structure 12 in FIG. 6.

As shown in FIG. 6, the keyboard module 50 is a force-sensing resistor keyboard, and the keyboard module 50 includes a force-sensing resistor base 502. With the configuration, when the user presses any one of obviously protruding portions on the covering structure 12 (i.e., the portions correspond to the first thermoplastic material layer parts 124a and the first bottom layer parts 120a), the force-sensing resistor base 502 will generate a signal corresponding to the pressed protruding portion on the covering structure 12 according to the location of the pressed protruding portion.

Figure 7:
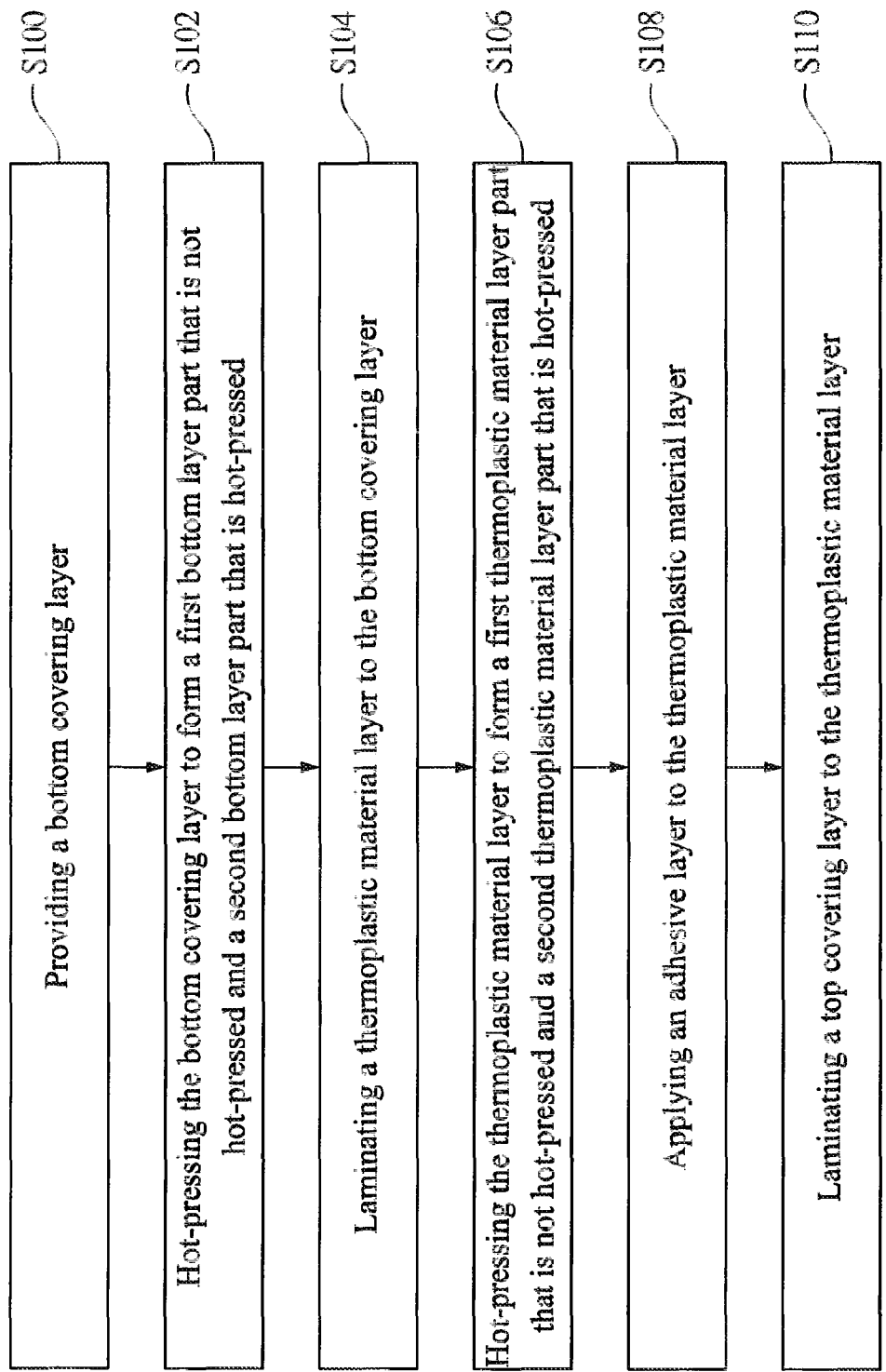
FIG. 7 is a flow chart of a manufacturing method of covering structure according to an embodiment of the disclosure.

FIG. 7 is a flow chart of a manufacturing method of covering structure according to an embodiment of the disclosure.

As shown in FIG. 7, with reference to FIG. 3 and FIG. 4, the manufacturing method of covering structure includes steps S100~S110 as below.

Step S100: providing a bottom covering layer 120.

Step S102: hot-pressing the bottom covering layer 120 to form a first bottom layer part 120a that is not hot-pressed and a second bottom layer part 120b that is hot-pressed.

It should be pointed out that in practice, the first bottom layer part 120a can also be hot-pressed in step S102, but the first bottom layer part 120a is hot-pressed with a smaller magnitude than that with which the second bottom layer part 120b is hot-pressed.

Step S104: laminating a thermoplastic material layer 124 to the bottom covering layer 120.

Step S106: hot-pressing the thermoplastic material layer 124 to form a first thermoplastic material layer part 124a that is not hot-pressed and a second thermoplastic material layer part 124b that is hot-pressed.

It should be pointed out that in practice, the first thermoplastic material layer part 124a can also be hot-pressed in step S106, but the first thermoplastic material layer part 124a is hot-pressed with a smaller magnitude than that with which the second thermoplastic material layer part 124b is hot-pressed.

Step S108: applying an adhesive layer 126 to the thermoplastic material layer 124.

Step S110: laminating a top covering layer 122 to the thermoplastic material layer 124.

By performing the steps S100~S110, the bottom covering layer 120, the top covering layer 122, and the thermoplastic material layer 124 can be laminated to form the covering structure 12 of the disclosure.

According to the foregoing recitations of the embodiments of the disclosure, it can be seen that the covering structure of the present disclosure is formed by laminating the bottom covering layer, the top covering layer, and the thermoplastic material layer, and both of the bottom covering layer and the thermoplastic material layer are hot-pressed to form different regions having different thicknesses. The regions of the bottom covering layer and the thermoplastic material layer that are not hot-pressed (or are hot-pressed with a smaller magnitude) correspond to the regions of the keyswitch units of the input device, and the covering structure is thicker at the regions of the bottom covering layer and the thermoplastic material layer. The other regions of the bottom covering layer and the thermoplastic material layer that are hot-pressed correspond to the regions outside the keyswitch units, and the covering structure is thinner at the regions of the bottom covering layer and the thermoplastic material layer. In other words, by performing the simple hot-pressing processes, the covering structure of the disclosure can form pressing portions having definite structures at the regions corresponding to the regions of the keyswitch units, so the problem of alignment accuracy of the conventional pressing pads can be solved. In addition, the keyswitch units of the input device of the disclosure can be dome supporting type keyswitches or scissors-like supporting type keyswitches, so the users can obtain better pressing feelings while pressing the keyswitch units through the covering structure, and can definitely realize whether the keyswitch units have been successfully triggered according to the pressing feelings.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A covering structure, comprising:
   a bottom covering layer;
   a top covering layer; and
   a thermoplastic material layer laminated between the bottom covering layer and the top covering layer, the thermoplastic material layer comprising a first thermoplastic material layer part and a second thermoplastic material layer part that are connected to each other, the first thermoplastic material layer part having a first thickness, the second thermoplastic material layer part having a second thickness, wherein the first thickness is larger than the thickness of the top covering layer, and the first thickness is larger than the second thickness.

2. The covering structure of claim 1, wherein the first thickness is 4~7 times of the second thickness.

3. The covering structure of claim 1, wherein the bottom covering layer comprises a first bottom layer part and a second bottom layer part that are connected to each other, the first thermoplastic material layer part is laminated between the first bottom layer part and the top covering layer, the second thermoplastic material layer part is laminated between the second bottom layer part and the top covering layer, the first bottom layer part has a third thickness, the second bottom layer part has a fourth thickness, and the third thickness is larger than the fourth thickness.

4. The covering structure of claim 3, wherein the third thickness is 1.2~1.7 times of the fourth thickness.

5. The covering structure of claim 3, wherein the sum of the first thickness, the third thickness, and the thickness of the top covering layer is 1.5~2.3 times the sum of the second thickness, the fourth thickness, and the thickness of the top covering layer.

6. The covering structure of claim 1, further comprising an adhesive layer adhered between the top covering layer and the thermoplastic material layer.

7. The covering structure of claim 1, wherein the material of the bottom covering layer comprises nylon, and the material of the thermoplastic material layer comprises Polyurethane.

8. The covering structure of claim 1, wherein the bottom covering layer is a knitted fabric layer, the top covering layer is a leather layer, and the thermoplastic material layer is a foam layer.

9. An input device, comprising:
   a keyboard module comprising a plurality of keyswitch units; and
   a covering structure comprising:
      a bottom covering layer covering and attached to the keyboard module;
      a top covering layer; and
      a thermoplastic material layer laminated between the bottom covering layer and the top covering layer, the thermoplastic material layer comprising a plurality of first thermoplastic material layer parts and a second thermoplastic material layer part, the second thermoplastic material layer part being connected to the first thermoplastic material layer parts, the first thermoplastic material layer parts respectively corresponding to regions of the keyswitch units, the second thermoplastic material layer part corresponding to a region outside the keyswitch units, each of the first thermoplastic material layer parts having a first thickness, the second thermoplastic material layer part having a second thickness, wherein the first thickness is larger than the thickness of the top covering layer, and the first thickness is larger than the second thickness.

10. The input device of claim 9, wherein the first thickness is 4~7 times of the second thickness.

11. The input device of claim 9, wherein the bottom covering layer comprises a plurality of first bottom layer parts and a second bottom layer part, the second bottom layer part is connected to the first bottom layer parts, each of the first thermoplastic material layer parts is laminated between the corresponding first bottom layer part and the top covering layer, the second thermoplastic material layer part is laminated between the second bottom layer part and the top covering layer, each of the first bottom layer parts has a third thickness, the second bottom layer part has a fourth thickness, and the third thickness is larger than the fourth thickness.

12. The input device of claim 11, wherein the third thickness is 1.2~1.7 times of the fourth thickness.

13. The input device of claim 11, wherein the sum of the first thickness, the third thickness, and the thickness of the top covering layer is 1.5~2.3 times the sum of the second thickness, the fourth thickness, and the thickness of the top covering layer.

14. The input device of claim 9, wherein the covering structure further comprises an adhesive layer adhered between the top covering layer and the thermoplastic material layer.

15. The input device of claim 9, wherein the material of the bottom covering layer comprises nylon, and the material of the thermoplastic material layer comprises Polyurethane.

16. The input device of claim 9, wherein each of the keyswitch units is a dome supporting type keyswitch.

17. The input device of claim 9, wherein each of the keyswitch units is a scissors-like supporting type keyswitch.

18. The input device of claim 9, wherein the keyboard module is a force-sensing resistor keyboard.

19. The input device of claim 9, wherein the bottom covering layer is a knitted fabric layer, the top covering layer is a leather layer, and the thermoplastic material layer is a foam layer.

20. A manufacturing method of covering structure, comprising:
   providing a bottom covering layer;
   laminating a thermoplastic material layer to the bottom covering layer;
   hot-pressing the thermoplastic material layer to form a first thermoplastic material layer part that is not hot-pressed and a second thermoplastic material layer part that is hot-pressed, wherein the first thermoplastic material layer part has a first thickness, the second thermoplastic material layer part has a second thickness, and first thickness is 4~7 times of the second thickness; and
   laminating a top covering layer to the thermoplastic material layer, wherein the first thickness is larger than the thickness of the top covering layer.

21. The manufacturing method of claim 20, wherein the step of providing the bottom covering layer comprises:
   hot-pressing the bottom covering layer to form a first bottom layer part that is not hot-pressed and a second bottom layer part that is hot-pressed, wherein the first thermoplastic material layer part is laminated between the first bottom layer part and the top covering layer, the second thermoplastic material layer part is laminated between the second bottom layer part and the top covering layer, the first bottom layer part has a third thickness, the second bottom layer part has a fourth thickness, and the third thickness is 1.2~1.7 times of the fourth thickness.

22. The manufacturing method of claim 21, wherein the sum of the first thickness, the third thickness, and the thickness of the top covering layer is 1.5~2.3 times the sum of the second thickness, the fourth thickness, and the thickness of the top covering layer.

23. The manufacturing method of claim 20, wherein the step of laminating the top covering layer to the thermoplastic material layer comprise:

applying an adhesive layer to the thermoplastic material layer, so as to make the top covering layer and the thermoplastic material layer that are laminated be adhered to each other.

24. The manufacturing method of claim 20, wherein the material of the bottom covering layer comprises nylon, and the material of the thermoplastic material layer comprises Polyurethane.

* * * * *